United States Patent [19]

Bielinski

[11] Patent Number: 4,916,689

[45] Date of Patent: Apr. 10, 1990

[54] COMMUNICATIONS APPARATUS FOR ENCODING AND DECODING MULTIPLEXED OPTICAL SIGNAL

[75] Inventor: Ralph F. Bielinski, South Milwaukee, Wis.

[73] Assignee: Eaton Corporation, Cleveland, Ohio

[21] Appl. No.: 138,936

[22] Filed: Dec. 29, 1987

[51] Int. Cl.[4] .............................................. H04B 9/00
[52] U.S. Cl. ...................................... 370/4; 455/607; 455/608; 455/612; 455/617
[58] Field of Search ............... 370/4, 1; 455/606, 607, 455/612, 617, 608, 613, 618, 619

[56] References Cited

U.S. PATENT DOCUMENTS

| | | | |
|---|---|---|---|
| 3,838,412 | 9/1974 | Jones et al. | 370/1 |
| 4,267,590 | 5/1981 | Bosotti | 455/600 |
| 4,348,758 | 9/1982 | Sutherland | 370/105 |
| 4,375,691 | 3/1983 | Hackett | 370/69.1 |
| 4,439,857 | 3/1984 | Rauth et al. | 455/612 |
| 4,468,765 | 8/1984 | Hensel et al. | 370/1 |

FOREIGN PATENT DOCUMENTS 0236426 6/1986 German Democratic Rep. ................................. 455/600

Primary Examiner—Robert L. Griffin
Assistant Examiner—Leslie Van Beek
Attorney, Agent, or Firm—James E. Niles; Thomas F. Kirby

[57] ABSTRACT

A fiber optic multiplexing controller for transmitting a separate original electrical signal to each of a plurality of signal receiving devices. Each separate original electrical signal originates from one or a plurality of signal sending units. A transmit section of the controller includes an encoder for encoding the separate original electrical signals into a single multiplexed electrical signal. The transmit section further includes a fiber optic transmitter for converting the multiplexed electrical signal to an optical signal. Thereafter, the optical signal is transmitted via fiber optics to a receive section of another identical controller. This receive section includes an optical receiver, provided for the purpose of receiving the transmitted optical signal and converting it to a multiplexed electrical signal. The multiplexed signal, whether electrical or optical, is made up of discrete portions. Each portion of the signal is devoted to a predetermined one of the separate original electrical signals. The receive section further includes a decoder for decoding or de-multiplexing the received multiplexed electrical signal into a corresponding number of received electrical signals, one for each of the receiving devices, and for forwarding the signals via drive circuits provided to communicate with the devices.

27 Claims, 5 Drawing Sheets

COMMUNICATIONS APPARATUS FOR ENCODING AND DECODING MULTIPLEXED OPTICAL SIGNAL

BACKGROUND OF THE INVENTION

This invention relates to controllers or interfaces between signal sending units and signal receiving devices, and in particular to controllers employing multiplexed fiber optic transmission of the necessary signals, and the accompanying conversions and multiplexing from original electrical signals to optical signals and back to electrical signals.

Certain types of equipment employ electrical devices, such as motors and solenoids, which perform various functions and which are selectively energizable by means such as relays. These relays are often controlled by digital control signals provided over electrically conducting wires, either from an electronic computer or from some other type of signal generating control, such as a human operator. In addition, these devices experience conditions which require monitoring and possibly response by the computer or the operator, in effect evidencing a need to transmit data back to the computer or the operator.

For example, certain types of commercial and military aircraft of advanced design employ relay-controlled electrical load devices, such as motors located in various separated parts of the aircraft, which are energizable in response to switches operated by a pilot. In addition, such devices are commonly energizable according to commands, generally low power digital electrical signals, from a control computer, which may be remotely situated in the cockpit. In turn, these devices may experience over-current conditions, or for some other reason be forced to trip to an open state, and the operator or computer need to be informed of these conditions so as to enable a responsive action. Further, the operator or computer even needs to be aware of the state of the contacts, that is, whether they are open or closed. Hence control signals need to flow both from and to the operator or computer. In the past, these control signals have been transmitted via individual wires, usually at least one pair of wires for each of the devices to be controlled. However, this arrangement of at least a separate pair of wires for each device to be controlled had the undesirable effect of adding a substantial amount of weight to the aircraft for each controlled device, in addition to the problems of control cable routing and mounting competition for the wiring space within an aircraft.

This invention relates to improvements to the devices set forth above and to solutions to the problems raised thereby.

SUMMARY OF THE INVENTION

The invention includes a fiber optic communications system for communicating signals between two sets of components within the system. The system includes a multiplexing controller for transmitting a separate original electrical signal to each of a plurality of devices, positioned in each of a control element and a data management element. Fiber optics provide data transmission at much lower weight and volume for a given volume of data transferred. In the present invention, each separate original electrical signal to be transmitted to a receiving device originates from one or a plurality of signal sending units. That is, the invention can be applied whether the signal is a control signal originating with the computer or operator referred to above, or is indicative of a trip condition or of the status of the contacts themselves, that is, whether they are open or closed, in one or more of the relays or other remote devices. The fiber optic multiplexing controller has a transmit section that includes encoding means for receiving and encoding the separate original electrical signals into a single multiplexed signal. The multiplexed signal is made up of discrete portions, each devoted to a predetermined one of the original signals. The transmit section further includes optical transmission means for receiving the multiplexed electrical signal and converting it to an optical signal. Thereafter the optical signal is transmitted via fiber optic cables to a receive section of another similar controller located remote from the first controller. The receive section includes an optical reception means, which receives the transmitted optical signal and converts it to a multiplexed electrical signal again comprising discrete portions, each of those portions being devoted to a predetermined one of the separate original electrical signals. The receive section further includes decoding means for decoding the received multiplexed electrical signal into a corresponding number of received electrical signals, one for each of the receiving devices. Each of the received electrical signals corresponds to one of the separate original electrical signals. Finally, a plurality of output drive circuits is provided, one for each of the receiving devices, for receiving the now de-multiplexed electrical control signals and communicating them to the receiving devices.

The encoding means includes synchronization means for generating a synchronization channel and combining it with the original electrical signals into the single, multiplexed electrical signal. This synchronization channel is arranged first in order of channels transmitted within the multiplexed electrical signal. Both the transmit section and the receive section include clock means so as to be able to use that synchronization channel to ensure that the proper separate original electrical signal finally arrives at the intended receiving device.

Generally, the original electrical signals are in digital form, that is, each assumes either an "on" state or an "off" state. Likewise, the devices to be controlled require signals controlling them to be in digital form, assuming either an "on" state and an "off" state. Hence the optical transmission means includes means for converting the "on" states of the original electrical signals, as occurring in the multiplexed electrical signal from the encoding means, to a period of a predetermined switching frequency in the optical signal, and for converting the "off" states of the original electrical signals, as occurring in the multiplexed electrical signal, to a period of a predetermined but much lower frequency in the optical signal. The term "frequency" used here indicates the turning on and off of an LED a number of times per second. Hence, when the original electrical signal is "on", the LED is turned on and off very quickly, whereas when the original electrical signal is "off", the LED is turned on and off relatively very slowly. To finish out the process on the receive end, the optical reception means includes means for converting the periods of high and low frequency to a multiplexed electrical signal as needed by the decoding means for decoding into electrical control signals to effect control of the devices.

It is thus an object of the invention to provide a fiber optic multiplexing controller for interfacing between one or more signal sending units, such as a control computer or a bank of switches, and a number of devices to be controlled, such as relays or remote control circuit breakers.

Other objects and advantages of the invention will become apparent hereinafter.

DESCRIPTION OF THE PREFERRED EMBODIMENT

Figure 1:
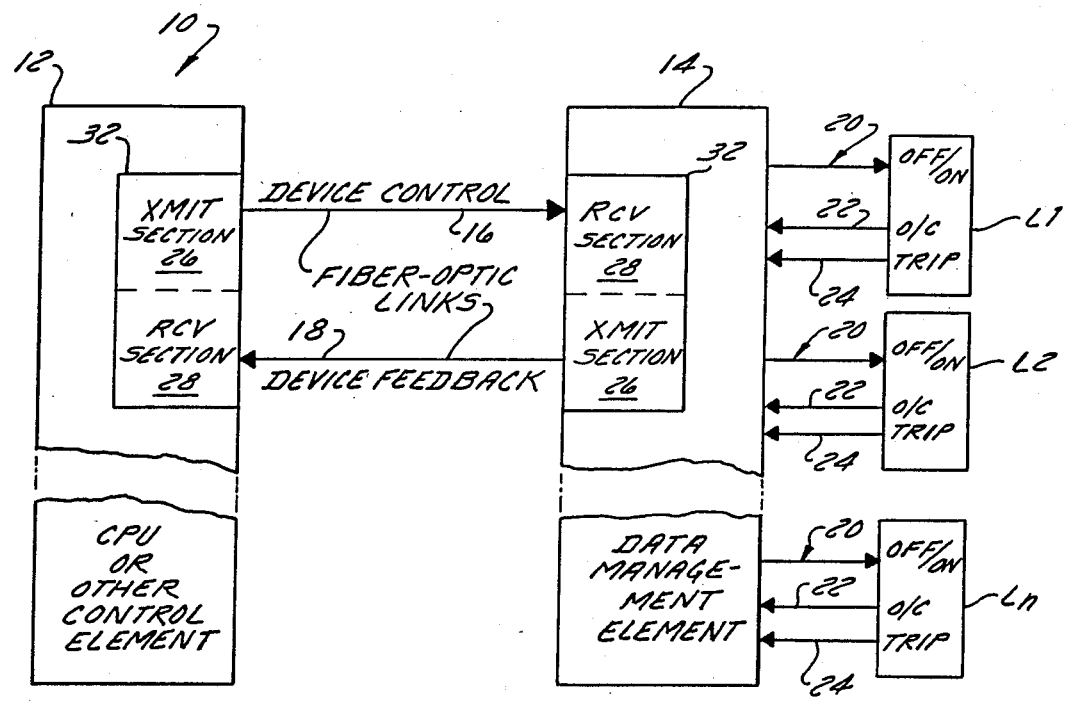
FIG. 1 is a flow diagram of a communications apparatus, including a control element, a number of devices under the control of the control element and feeding back information on their condition, and a data management element positioned therebetween.

Referring now to FIG. 1, there is shown a control system 10 for controlling a plurality of load devices L1, L2, . . . Ln, such as load control relays or remote control circuit breakers. The invention is especially well adapted for use in aircraft control systems, but could also find equally suitable application in other control systems, such as on a factory floor. The control system 10 includes a CPU or other control element 12 connected to a data management element 14 via a pair of fiber optic links 16 and 18. One of the fiber optic links, link 16, carries control signals to the data management element 14. The data management element 14 in turn is connected to each of the load devices L1, L2, . . . Ln by a control link 20 for transmitting control signals to the load devices, that is, open and close signals, and by feedback links 22 and 24 to transmit information about the condition of the devices back to the data management element 14. In the embodiment shown in FIG. 1, for instance, feedback link 22 transmits a signal as to whether the particular device is open or closed, while link 24 transmits a signal that the particular device is in a trip condition. This feedback information is then carried back to the control element 12 via fiber optic link 18.

Figure 2:
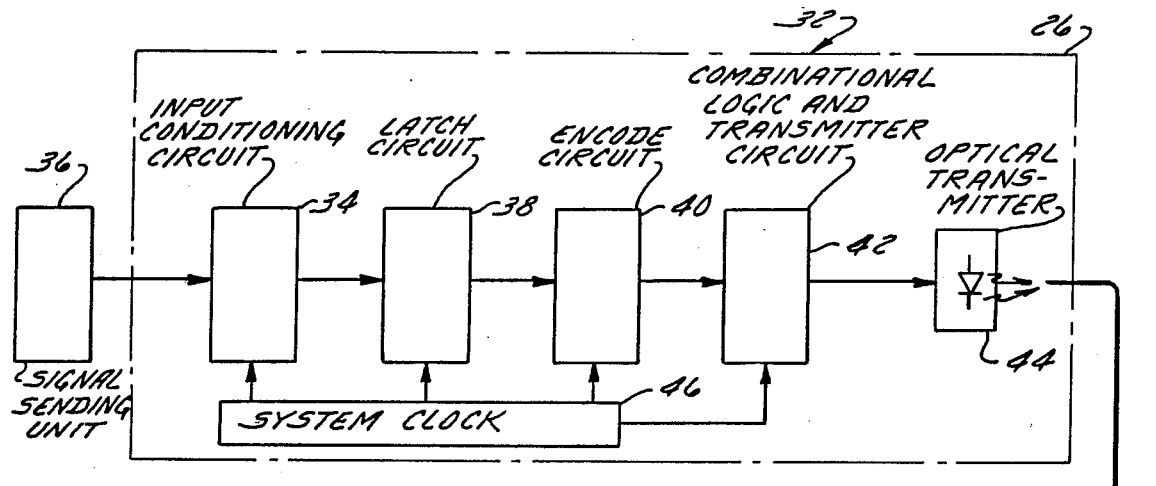
FIG. 2 is a flow diagram of a transmit section of one fiber optic multiplexing controller and a receive section of another fiber optic multiplexing controller, connected together according to a preferred embodiment of the invention.
Figure 2:
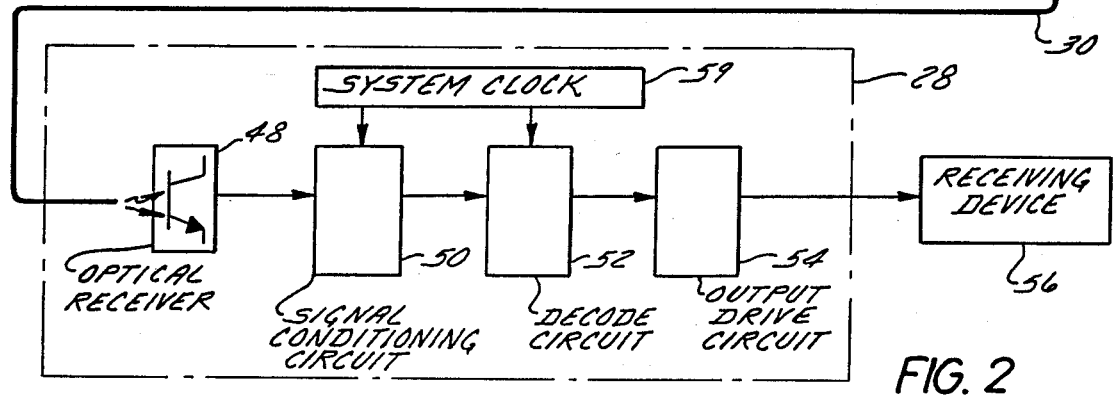

As indicated by reference to FIG. 1, the preferred embodiment of the present invention contemplates two communications apparatuses 32, one being positioned in the control element 12 and a second being located in the data management element 14, each having a transmit section 26 as shown in FIG. 2 FIG. 3 shows an entire communications apparatus 32, having both a transmit section 26 and a receive section 28, as generally required to handle communications in both directions, that is, of control signals from the control element 12 to the devices L1, L2, . . . Ln, and of feedback or condition signals in the reverse direction.

TRANSMIT SECTION

As indicated in FIG. 2, each transmit section 26 is connected to receive signals from a signal sending unit 36, whether that signal sending unit be control element 12 or one of the load devices L1, L2, . . . Ln. Each of the signals is predetermined to be related to one of the load devices L1, L2, . . . Ln, whether an open or close signal from the control element 12 or a trip or open/close indication from the load devices L1, L2, . . . Ln.

The transmit section 26 includes an input conditioning circuit 34 for receiving and conditioning all of the signals to be transmitted. The conditioning performed here includes switch de-bouncing since the circuit is designed to be connectable to a control console consisting of switches operated by a human operator or pilot, besides being capable of being connected to a control computer. In addition, there may likely occur some bounce in the load devices L1, L2, . . . Ln on trip or opening and closing of the contacts. Further, the conditioning includes general noise reduction and filtering.

From the input conditioning circuit 34, the now-conditioned signals continue to a latch circuit 38, which latches the signals in the state they are in at the time that the signal is assembled as will be described below. That is, latch circuit 38 prevents the state of each signal from changing during the period of transmission, since to allow any such change of state would corrupt the transmission signal. From there, the now-latched signals are passed to an encode circuit 40, where several signals relating to the several devices are combined into a serial data word, that is, the signals are multiplexed together into a multiplexed electrical signal for later transmission.

The output of the encode circuit 40, that is, the multiplexed electrical signal, is sent to a combinational logic and transmitter circuit 42, which drives an optical transmitter 44 in converting the multiplexed electrical signal to a multiplexed optical signal for transmission via the fiber optic link 30.

Each of the above elements within the transmit section 26 is synchronized with each other by connection to a system clock 46. The importance of synchronization and the system clock 46 will be set forth in more detail subsequently herein.

RECEIVE SECTION

As indicated, the optical signal referred to above is transmitted via the fiber optic link 30 to the receive section 28 located in the opposite communications apparatus 32, as shown in FIGS. 1 and 2. The fiber optic link 30 is connected to an optical receiver 48, wherein the multiplexed optical signal is converted into a multiplexed electrical signal. From the optical receiver 48, the multiplexed electrical signal is sent to a signal conditioning circuit 50, mainly for the purpose of conditioning the logic signal from the optical receiver 48, and making the signal a more perfect square wave. Generally, elimination of noise at this point will not be necessary because of the clean and noise-free nature of fiber optic transmission.

The conditioned signal then proceeds to a decode circuit 52, which decodes the multiplexed electrical signal into signals relating to each of the load devices L1, L2, . . . Ln, and passes the signals on to a number of output drive circuits 54 that is the same as the number of receiving devices. Each relevant signal is thus communicated to the appropriate receiving device 56.

Similar to the transmit section 26, the receive section 28 includes a system clock 58 for synchronizing the signal conditioning circuit 50 and the decode circuit 52 properly with the signal.

DETAIL OF COMMUNICATIONS APPARATUS

The details of the preferred embodiment of the communications apparatus 32 explained generally above and shown in FIG. 2 are shown in FIGS. 3A, 3B, 3C and 3D, which show a single circuit including one transmit section 26 and one receive section 28, both connected to a single system clock 59 for synchronizing the various parts within the particular sections. This embodiment would most advantageously be applied to the data management element 14 shown in FIG. 1, because it shows a number of discrete inputs and a number of discrete outputs. Where there are preferred or required to be any differences between the communications apparatus 32 applied to the data management element 14 and the apparatus applied to the control element 12, those will be stated.

Figure 3A:
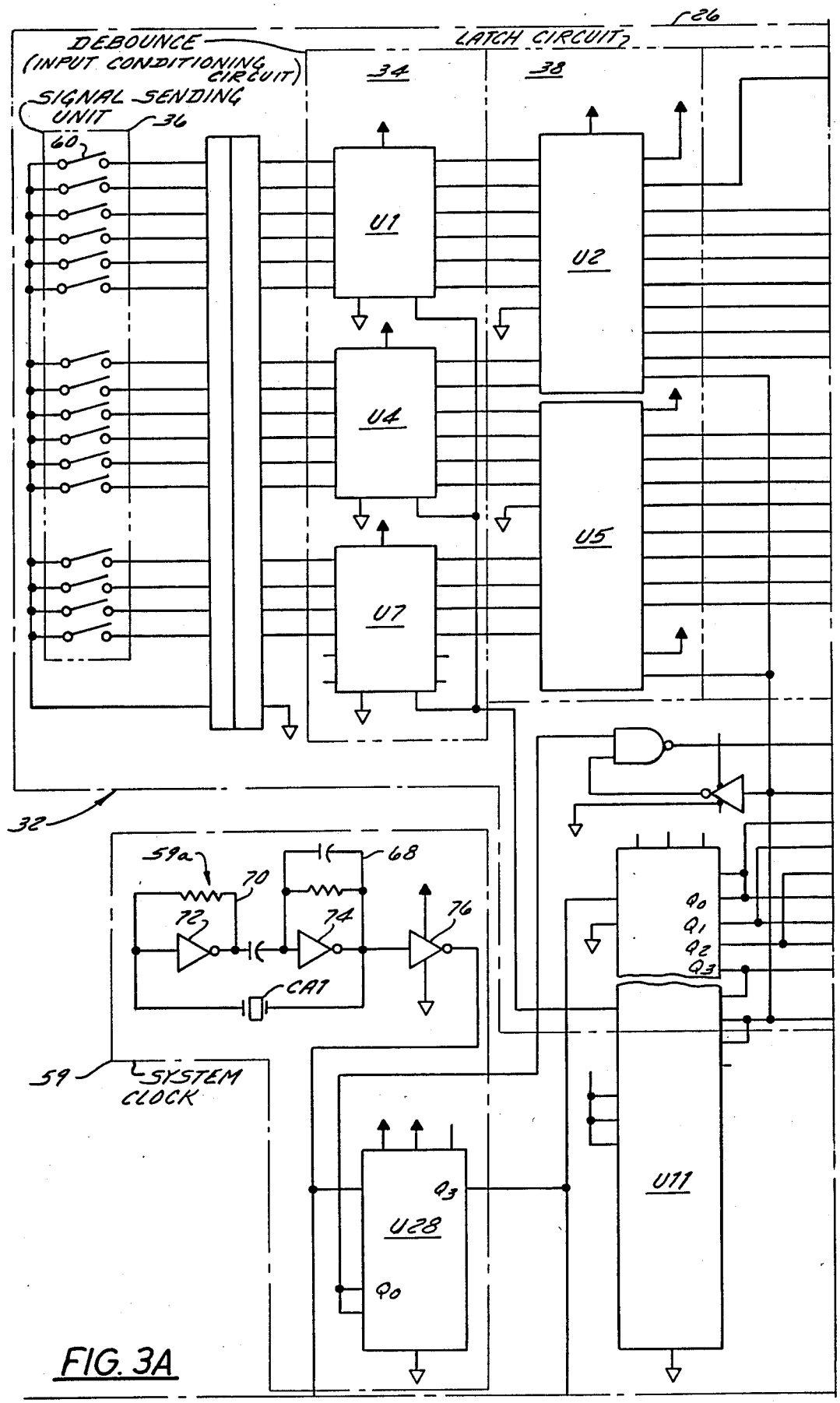
FIGS. 3A, 3B, 3C and 3D are, together, an electronic circuit diagram of a fiber optic multiplexing controller constructed according to a preferred embodiment of the invention, having both transmit and receive sections.

Referring now to FIGS. 3A, 3B, 3C and 3D, the signal sending unit 36 comprises a bank of switches 60. While FIG. 3A shows these switches 60 as physical switches, they may alternatively be any type of switch means including switches of a semiconductor type. Generally each switch shown corresponds to an open/close indication or a trip indication from one of the load devices L1, L2, ... Ln. Further, while there are shown a total of 16 such switches 60, it will become apparent subsequently herein why not all of these inputs are practically usable.

Assuming that the apparatus 32 is installed in the data management element 14, shown in FIG. 1, the switches 60 represent inputs from the devices L1, L2, ... Ln, as stated above. If the apparatus 32 were installed in the control element 12, the switches 60 could represent either a bank of switches to be operated by a human operator, such as a pilot, or a number of signal lines from a control computer.

As indicated above, an input conditioning circuit 34 is connected to the signal sending unit 36. In FIG. 3A, the input conditioning circuit 34 comprises integrated circuits U1, U4 and U7, which in this embodiment are MC14490 chips. These are provided for de-bouncing the input signals, since bounce in the switches 60 could cause substantial false indications in the apparatus. Further, these integrated circuits perform a noise elimination function, which would be applicable even if the signal sending unit were not a bank of switches, but rather a source of logic signals such as a computer. Three MC14490 chips are provided since each such chip is capable of handling six signal lines, and there are a total of 16 such signal lines from the signal sending unit 36 to be conditioned.

As further indicated above, the signals are then passed to a latch circuit 38. Again, the purpose of the latch circuit 38 is to prevent the state of any signal from changing during the period of transmission. In FIG. 3A, latch circuit is shown to include two integrated circuits U2 and U5. These ICs are preferred to be 74LS273 chips, since they are low cost, low power, widely available latching circuits. Two such chips are required because each is capable of handling eight signal lines, and there are a total of 16 such signal lines from the conditioning circuit 34 to be latched.

Figure 3B:
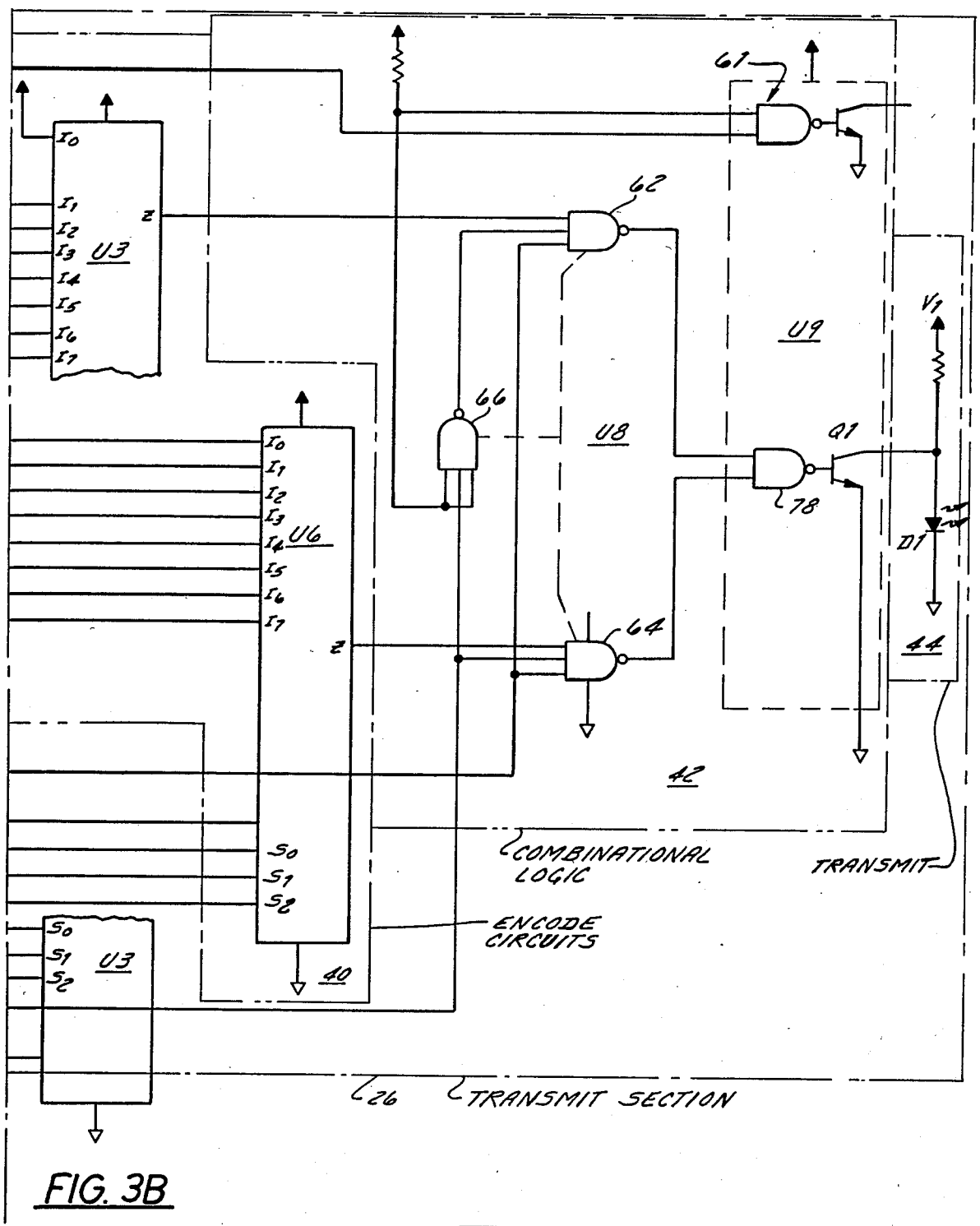

From the latch circuit 38, the signals are sent to the encode circuit 40 for combining the signals into a serial data word, that is, multiplexing the signals together into a multiplexed electrical signal for later transmission. As shown in FIG. 3B, the encode circuit 40 includes two encoding integrated circuits U3 and U6. These ICs are preferred to be counter chips such as 74LS151 chips. These chips have the capability of encoding 8 signals, received on inputs I0 through I7, into one, resulting in the use of two such chips in this circuit. Notice that each chip has eight signal inputs I0 through I7 and only one signal output Z, due to its encoding function. Notice also, though, that U3 has only seven signal lines leading from U2 into it. In the embodiment shown in FIGS. 3A and 3B, the first signal from U2 is not encoded with the others, since the first bit always sent is a synchronization pulse or bit. In the present embodiment this first output signal from U2 is held aside as a spare at 61 (FIG. 3B). The first input I0 into U3 is then tied high. With this input tied high, the first bit of data ultimately transmitted by the optical transmitter 44 is always a certain predetermined state, in this case because of the logic the first bit transmitted will be a low signal, so that the receive section can synchronize on that bit. This effect is similar to a start bit in RS-232 communications.

Assuming 16 total communication channels, this synchronization pulse takes up the first of these channels, leaving a maximum of 15 communication channels for actual data. Assuming that there are two channels required for each load device L1, L2, ... Ln, that is, trip and open/close, this allows for reporting back to the control element 12 with he status of up to seven such load devices over a single fiber optic link 30 (FIG. 2).

Within the combinational logic and transmitter circuit 42, the output signals from the two encode chips U3 and U6 are both sent to a logic chip U8, wherein NAND gates 62, 64 and 66 arbitrate the order of signals sent, based on signals sent from the system clock 59 via a divider chip U11 (FIG. 3A). As shown in FIG. 3A, the system clock 59 includes a timer portion 59a and an integrated circuit U28. Chip U28 is preferably a divider chip such as a 74LS197. Timer portion 59a includes generally conventionally arranged elements of a clock timer, including a crystal oscillator CA1 and RC networks 68 and 70 connected with inverters 72, 74 and 76. The signal from this clock timer portion 59a is divided into various proportional parts by U28. The Q3 output divides the timer ticks by 16, while the Q0 output divides the timer ticks by 2. The Q3 output, which divides the clock input by 16, is used as a clock input to integrated circuit U11, which as also preferably a divider chip such as the 74LS197. Chip U11 has divider outputs Q0, Q1 and Q2, which are successively further divided timer outputs, dividing the clock input by 2, 4 and 8 respectively. These outputs control the inputs S0, S1 and S2 respectively of encoder chips U3 and U6, thus enabling the encoder chips to encode the data input to them into a single output line. Chip U11 further has a divider output Q3 which divides the clock input by 16. This output Q3 of chip U11 is used by NAND gates 62, 64 and 66 to determine that the output Z of encoder chip U3 is taken first, and thereafter the output Z of encoder chip U6, in controlling the diode D1. Thus it is ensured that the signals from the first seven switches 60 are first sent, followed by the signals from the last eight switches 60.

From logic chip U8, the output of the NAND gates 62 and 64 are sent to a driver chip U9, which includes a NAND gate 78, connected so as to drive a transistor Q1. The transistor Q1 acts as a drain, draining current from the voltage source V1 when energized and, when not energized, allowing the current to flow through the light emitting diode D1 so as to send a light signal outward via fiber optic link 18 (FIG. 1) to a similar communications apparatus 32 at the control element 12. The Q0 output of divider chip U28 divides its clock input by 2, and is the frequency used by NAND gates 62, 64 and 78 to flash the diode D1 when it is on.

Figure 4:
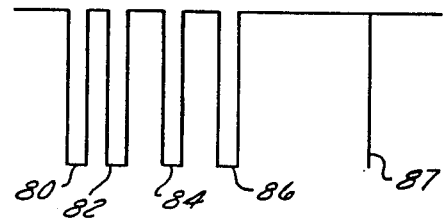
FIG. 4 is a waveform diagram of a wave transmitted over the fiber optic link according to the invention.

The shape of an example signal being transmitted is shown in FIG. 4. In that figure, a "low" value, or a wave including a frequency as shown in the figure, corresponds to a logical "1", whereas a "high" value, that is, one that has no frequency within itself, corresponds to a logical "0". As indicated in that figure, the first "1" signal 80 constitutes the synchronization pulse. Thereafter, each "1" signal 82, 84 and 86 indicates the presence of a condition to be tested for in one of the load devices L1, L2, . . . Ln, and which load device is indicating the condition. That is, which channel has a "1" value signifies which device and which condition within that device is indicated. In that figure, bits 3, 6 and 9 have a frequency and thus indicate that the devices corresponding to those bits are present. The line 87 indicates a very short pulse to signify the beginning of the reset period, during which all inputs 60 are again sensed in preparation for the next transmission period.

Figure 3C:
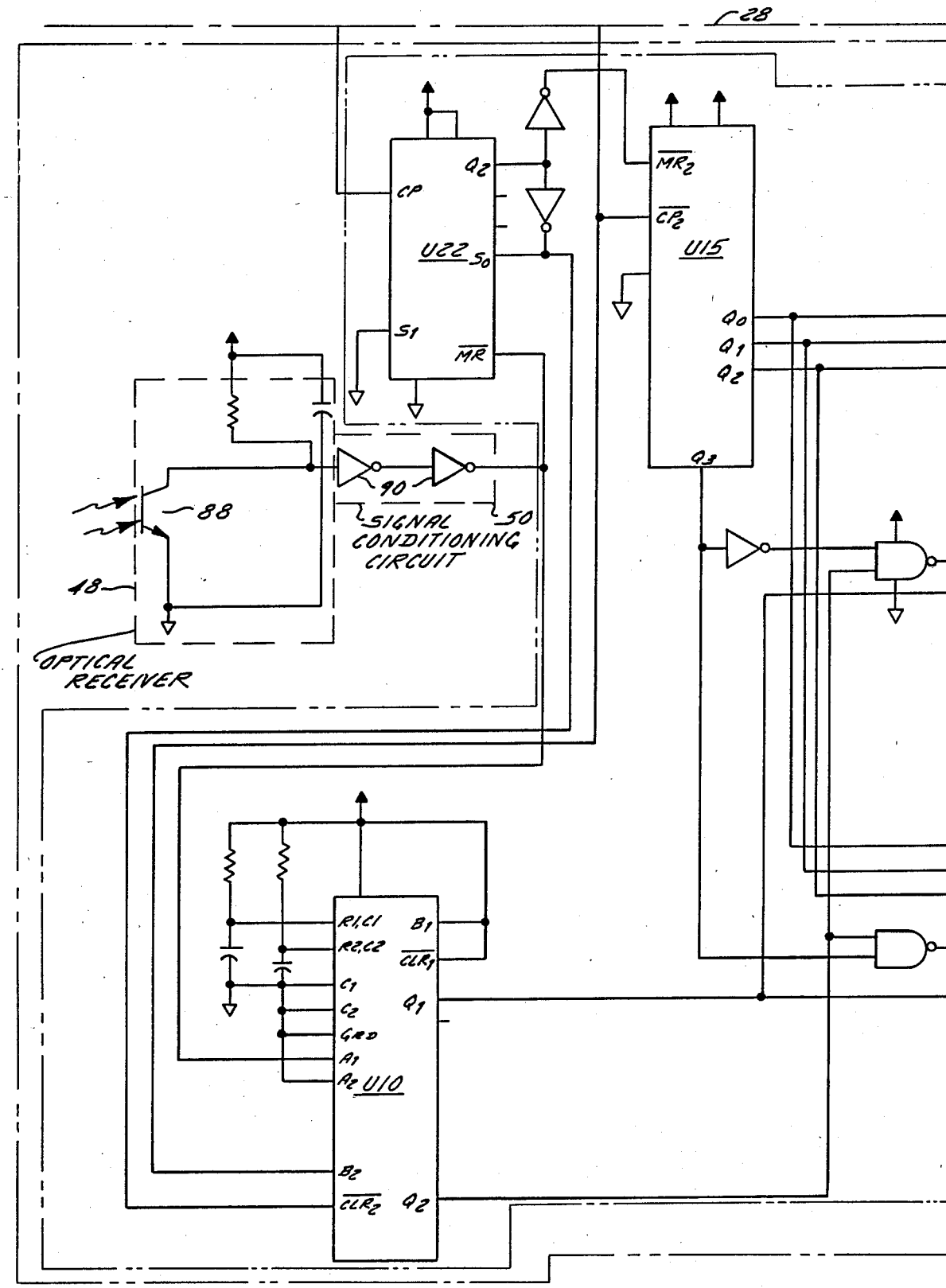
Figure 3D:
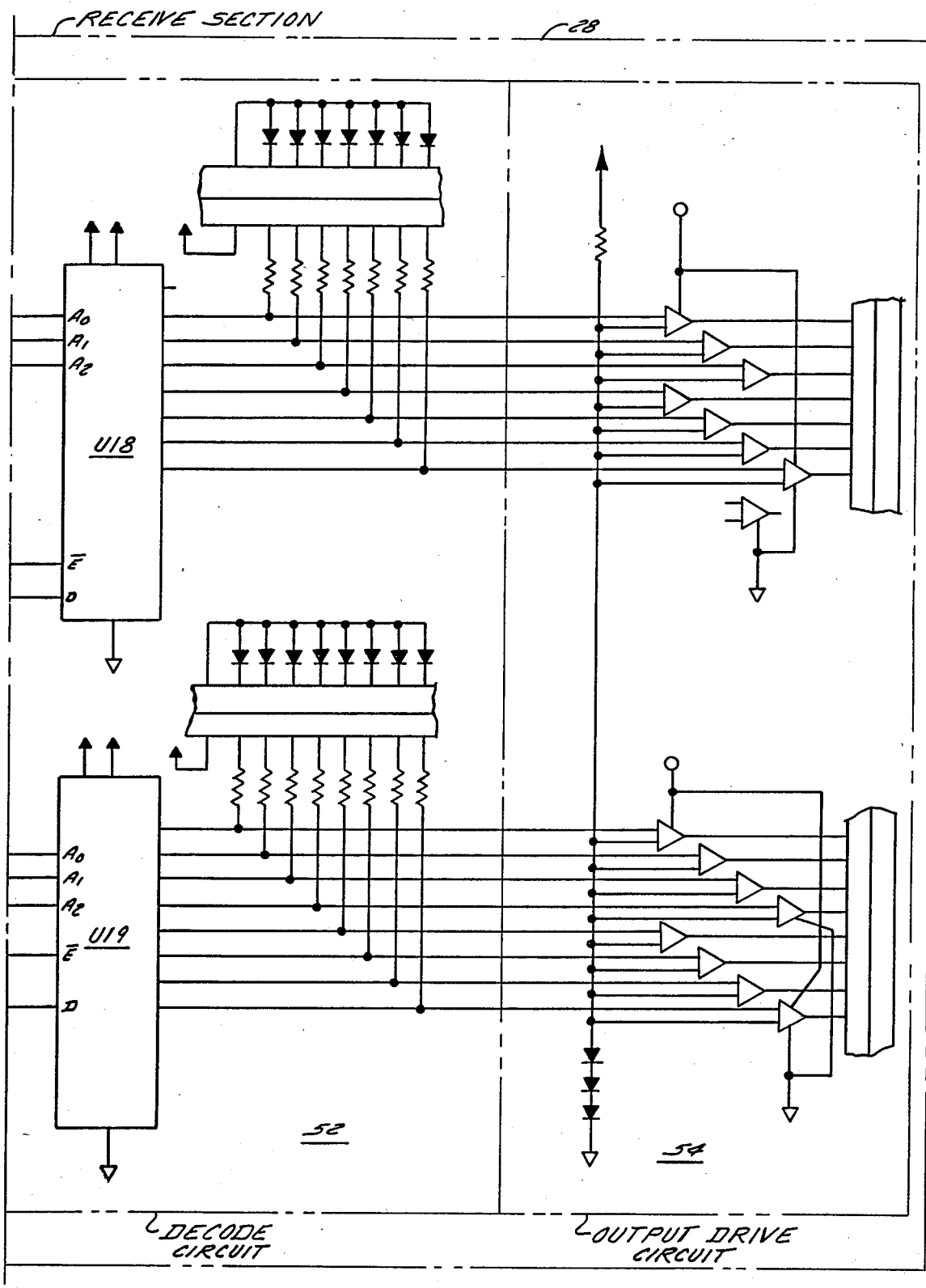

The signal transmitted by the diode D1, via fiber optic link 30 (FIG. 2), is received in a receive section similar to the receive section 28 shown in FIGS. 3C and 3D, although located in the control element 12. Since the actual receive section 28 shown in FIGS. 3C and 3D is configured to be located in the data management element 14, it will be described with respect to that environment, as connected to the load devices L1, L2, . . . Ln, with any necessary differences between that environment and the environment of the control element 12 stated specifically.

A signal similar to that referred to above, except carrying control signals to the load devices L1, L2, . . . Ln, is received via the fiber optic link 30 (FIG. 2) at the light sensitive transistor 88, referring now to FIGS. 3C and 3D, and there converted from an optical signal to an electrical signal. From the light sensitive transistor 88, the electrical signal is passed to a signal conditioning circuit 50, embodied here by a pair of buffers 90, provided for the purpose of conditioning the signal from the transistor 88 into a clean logic signal. Although one buffer 90 would be sufficient to accomplish the conditioning function, two such buffers are supplied here because each such buffer has the effect of inverting the signal, but it is desired to have a non-inverted signal after the conditioning. Therefore the first buffer inverts the signal, and the second one inverts it again, thereby restoring it to its original sign.

From there, the signal is sent to the decode circuit 52, which first comprises integrated circuits U10 and U22. Chip U10 is preferably a 74LS123, while chip U22 is preferably a 74LS194. These are included for the purpose of determining whether the particular portion of the signal presently being received from the buffers 90 is a frequency or a low signal. That is, chips U10 and U22 examine the frequency being received and determine whether it is a relatively faster frequency, being flashed quickly by the output Q0 of divider chip U28, indicating that the particular relevant switch 60 is closed, or whether it is a relatively slower frequency, indicating that it is not being flashed, signifying that the particular relevant switch 60 is open.

Decode circuit 52 further includes decoder integrated circuits U15, U18 and U19. Similar to chips U11 and U28, chip U15 is preferably a 74LS197 divider chip, while U18 and U19 are preferably 74LS259 chips, which take basically one input and break it up into its eight relevant parts. Similar to the encode circuit the detail of which is set forth above, chip U15 receives clock pulses from chip U28 and divides them based on which output is taken. The four outputs Q0, Q1, Q2 and Q3 divides the pulses input by 2, 4, 8 and 16 respectively. The Q0, Q1 and Q2 outputs drive the A0, A1 and A2 inputs of each of the chips U18 and U19, with the actual chip selected to transmit by the Q3 output of U15.

Thus, again employing pulses from the system clock 59, these decoder chips U18 and U19 determine which part of the mutliplexed signal applies to the each of the load devices L1, L2, . . . Ln. The now de-multiplexed signal is sent along to the proper receiving device 56 via output drive circuits 54. In the case shown in FIGS. 3C and 3D, since the outputs are directed to load devices L1, L2, . . . Ln, the output drive circuits include op amps as shown.

If the receiving device 56 were a device such as control element 12, some conventional type of buffer and latch arrangement would be appropriate, to allow the control element to read the presented information in its own time.

While the apparatus hereinbefore described is effectively adapted to fulfill the aforesaid objects, it is to be understood that the invention is not intended to be limited to the particular preferred embodiments of fiber optic multiplexing communications apparatus herein set forth. Rather, it is to be taken as including all reasonable equivalents without departing from the scope of the appended claims.

I claim:

1. A fiber optic multiplexing communications apparatus for receiving separate original electrical digital signals originating from a plurality of signal sending units, and for transmitting information based on said separate original electrical digital signals to a plurality of receiving devices to operate the latter, said apparatus comprising:

encoding means for encoding said separate original electrical digital signals into a single multiplexed optical signal comprising discrete portions, including a synchronization signal portion and other portions, each of said other portions being devoted to one of said separate original electrical signals and capable of exhibiting a signal of predetermined frequency when its corresponding original electrical digital signal is in an "on" state and capable of exhibiting no signal when its corresponding original electrical digital signal is in an "off" state;

fiber optic transmission means for transmitting said multiplexed optical signal;

decoding means for receiving the transmitted optical signal from said fiber optic transmission means and for decoding said optical signal into a plurality of received electrical signals, one for each of said plurality of receiving devices, each of said received electrical signals corresponding to one of said separate original electrical digital signals;

a plurality of output drive circuits, one for each of said receiving devices, for distributing said received electrical signals to the proper ones of said receiving devices;

and means for periodically sensing the status of said plurality of separate original electrical digital signals and for providing reset signals to said encoding means to cause the latter to provide a sequence of single multiplexed optical signals.

2. A fiber optic multiplexing communications apparatus as recited in claim 1 wherein said encoding means includes:

input conditioning means for conditioning the debouncing said original electrical digital signals;

encoding circuits for combining said original electrical digital signals into a single multiplexed electrical signal; and conversion means for converting said single multiplexed electrical signal into said single multiplexed optical signal for transmission via said fiber optic transmission means.

3. A fiber optic multiplexing communications apparatus as recited in claim 2 wherein said encoding circuits include synchronization means for generating a synchronization channel and combining it with channels devoted to said original electrical digital signals into said single multiplexed electrical signal, said synchronization channel being arranged first in order of channels transmitted within said multiplexed electrical signal.

4. A fiber optic multiplexing communications apparatus as recited in claim 2 wherein said decoding means includes an optical reception circuit having a light sensitive transistor for converting said multiplexed optical signal to a multiplexed electrical signal.

5. A fiber optic multiplexing communications apparatus as recited in claim 1
wherein said original electrical digital signals each have an "on" state and an "off" state;
wherein said receiving devices require electrical control signals which are in digital form, each having an "on" state and an "off" state;
wherein said encoding means includes means for converting said "on" state of each of said original digital electrical signals to a period of a predetermined frequency and for converting said "off" state of each of said original electrical digital signals to a period of no signal; and
wherein said decoding means includes means for converting the periods of frequency and the periods of no signal to electrical digital control signals as needed to be received by said receiving devices.

6. A fiber optic multiplexing communications apparatus as recited in claim 5 wherein said encoding means include synchronization means for generating a synchronization channel and combining it with channels for said original electrical signals into said single multiplexed electrical signal, said synchronization channel being arranged first in order of channels transmitted within said multiplexed electrical signal.

7. A fiber optic multiplexing communications apparatus as recited in claim 6 further comprising first clock means connected to said encoding means and second clock means connected to said decoding means for employing said synchronization channel to synchronize said encoding means and said decoding means so as to ensure that the proper separate original electrical digital signal is directed to effect operation of the desired 8. A fiber optic multiplexing communications apparatus for transmitting a separate original electrical signal to each of a plurality of receiving devices, each separate original electrical signal originating from one of a plurality of signal sending units, said apparatus comprising:

encoding means for encoding the separate original electrical signals into a first single multiplexed electrical signal comprising discrete portions, including a synchronization signal portion and other portions, each of said other portions being devoted to a predetermined one of said separate original electrical signals and capable of exhibiting a signal of predetermined frequency when its corresponding original electrical signal is in one state and capable of exhibiting no signal when its corresponding original electrical signal is in another state;

optical transmission means for converting said first single multiplexed electrical signal to a multiplexed optical signal and for transmitting said multiplexed optical signal;

optical reception means for receiving and converting said transmitted optical signal to a second single multiplexed electrical signal comprising discrete portions, including a synchronization signal channel and other channels, each of said other channels being devoted to a predetermined one of said separate original electrical signals and capable of exhibiting a signal of predetermined frequency when its corresponding original electrical digital signal is in said one state and capable of exhibiting no signal when its corresponding original electrical digital signal is in said other state;

decoding means for decoding said second single multiplexed electrical signal into a plurality of electrical control signals, one for each of said plurality of receiving devices, each of said electrical control signals corresponding to one of said separate original electrical signals;

a plurality of output drive circuits, one for each of said plurality of receiving devices, for communicating said electrical control signals to said receiving devices;

and means for periodically sensing the status of said plurality of separate original electrical signals and for providing reset signals to said encoding means to cause the latter to provide a sequence of first single multiplexed electrical signals.

9. A fiber optic multiplexing communications apparatus as recited in claim 8 wherein said optical transmission means includes:

an optical transmission circuit having a light emitting diode for converting said first single multiplexed electrical signal to said multiplexed optical signal, and fiber optical cabling for carrying said multiplexed optical signal to said optical reception means.

10. A fiber optical multiplexing communications apparatus as recited in claim 8 wherein said optical reception means includes an optical reception circuit having a light sensitive transistor for converting said multiplexed optical signal to said second single multiplexed electrical signal.

11. A fiber optic multiplexing communications apparatus as recited in claim 8 wherein said encoding means include:

input conditioning means for conditioning and debouncing said separate original electrical signals; and encoding circuits for combining said separate original electrical signals into said first single multiplexed electrical signal.

12. A fiber optic multiplexing communications apparatus as recited in claim 11 wherein said encoding circuits include synchronization means for generating said synchronization channel and combining it with said other channels into said first single multiplexed electrical signal, said synchronization channel being arranged first in order of channels transmitted within said first single multiplexed electrical signal.

13. A fiber optic multiplexing communications apparatus as recited in claim 12 further comprising first clock means connected to said encoding means and second clock means connected to said decoding means for employing said synchronization channel to synchronize said encoding means and said decoding means so as to ensure that the proper separate original electrical signal effects operation of a desired receiving device.

14. A fiber optic multiplexing communications apparatus as recited in claim 8
wherein said separate original electrical signals are in digital form, each having an "on" state and an "off" state;
wherein said receiving devices require said electrical control signals to be in digital form, each having an "on" state and an "off" state;
wherein said optical transmission means includes means for converting said "on" states of said separate original electrical signals, as occurring in said first single multiplexed electrical signal from said encoding means, to a period of a predetermined frequency, and for converting said "off" states of said separate original electrical signals, as occurring in said first single multiplexed electrical signal from said encoding means, to a period of no signal; and
wherein said optical reception means includes means for converting said periods of frequency and said periods of no signal to a second single multiplexed electrical signal as needed by said decoding means for decoding into said electrical control signals to effect control of said receiving devices.

15. A system for fiber optical communications for communicating a plurality of signals between a control element and a data management element, said data management element being connected to a plurality of devices to be controlled, said system comprising:
A. a pair of communications apparatuses, one located at and connected for communication with said control element, and the other located at and connected for communication with said data management element, each communications apparatus including a transmit section and a receive section, the transmit section of each communications apparatus connected via a fiber optic link to the receive section of the other communications apparatus;
B. each transmit section comprising:
1. encoding means for encoding separate original electrical signals into a first single multiplexed electrical signal comprising discrete channels, each of said channels being devoted to a predetermined one of said separate original electrical signals; and
2. optical transmission means for converting said first single multiplexed electrical signal to an optical signal and for transmitting said optical signal via a fiber optic link;
C. each receive section comprising:
1. optical reception means for receiving and converting said transmitted optical signal to a second single multiplexed electrical signal comprising discrete channels, each of the last-recited channels being devoted to a predetermined one of said separate original electrical signals;
2. decoding means for decoding said second single multiplexed electrical signal into a plurality of received electrical signals, each of said received electrical signals corresponding to one of said separate original electrical signals; and
3. a plurality of output drive circuits for communicating said received electrical signals to the respective element to which the respective apparatus is connected;
D. and a plurality of feedback signal generators in at least one of said communications apparatuses, each generator being operable in response to an operating condition of one of said devices in its respective apparatus to provide an electrical feedback signal indicative of an operating condition to the encoding means of its respective communications apparatus for incorporation into the optical signal thereof whereby an electrical signal based on feedback signal information provided by said decoding means of the other communications apparatus effects the operation of the device to be controlled in the said one communications apparatus.

16. A system for fiber optic communications as recited in claim 15 wherein said transmit section further includes input conditioning means for conditioning said separate original electrical signals.

17. A system for fiber optic communications as recited in claim 15 wherein said separate original electrical signals are in digital form, each having an "on" state and an "off" state;
wherein said elements require said received electrical signals to be in digital form, each having an "on" state and an "off" state;
wherein said optical transmission means includes means for converting said "on" states of said separate original electrical signals, as occurring in said first single multiplexed electrical signal from said encoding means, to a period of a predetermined frequency, and for converting said "off" states of said original electrical signals, as occurring in said first single multiplexed electrical signal from said encoding means, to a period of no signal; and
wherein said optical reception means includes means for converting said periods of frequency and said periods of no signal to said second single multiplexed electrical signal as needed by said decoding means for decoding into said received electrical signals to effectively communicate said separate original electrical signals.

18. A system for fiber optic communications as recited in claim 17 wherein said encoding circuits include synchronization means for generating a synchronization channel and combining it with said discrete channels based on said separate original electrical signals into said first single multiplexed electrical signal, said synchronization channel being arranged first in order of channels transmitted within said first single multiplexed electrical signal.

19. A system for fiber optic communications as recited in claim 18 further comprising clock means connected to each said encoding means and to each said decoding means within each said communications apparatus, for employing said synchronization channel to synchronize each said encoding means and each said decoding means connected thereto by said optical transmission means.

20. Communication apparatus for operating a plurality of signal receiving devices in response to a plurality of separate original electrical digital signals originating from a plurality of signal sending units, each original signal having an "on" state or an "off" state, said communication apparatus comprising:

first means for receiving said separate original electrical digital signals and for providing a single multiplexed signal comprising discrete channels, including a synchronization signal channel and a plurality of other channels, each other channel devoted to one of said separate original electrical digital signals and capable of exhibiting a signal of predetermined frequency when its corresponding original digital signal is in one state and capable of exhibiting no signal when its corresponding original digital signal is in the other state;

and second means for receiving said single multiplexed signal and for providing a plurality of electrical digital output signals corresponding to said signals exhibited by said other channels of said single multiplexed signal for operating said plurality of signal receiving devices;

and means for periodically sensing the status of said plurality of separate original electrical digital signals and for providing reset signals to said first means to cause the latter to provide a sequence of said single multiplexed signals.

21. Communication apparatus according to claim 20 wherein said single multiplexed signal is an optical signal and wherein said apparatus further includes fiber optic transmission means for transmitting said optical signal from said first means to said second means.

22. A system for communicating between a control element and a data management element, said data management element being connected to a plurality of control devices to be controlled, said control element being connected to a plurality of status indicating devices, each of the elements adapted to provide a plurality of separate electrical digital original signals, each of which has an "on" state or an "off" state, said system comprising:

a pair of communication apparatuses, one connected to said control element and the other connected to said data management element, each communication apparatus including a transmit section and a receive section, first means in each transmit section for receiving said separate original electrical digital signals from the element to which it is connected and for providing a single multiplexed signal comprising discrete channels, including a synchronization signal channel and a plurality of other channels, each other channel devoted to one of said separate original electrical digital signals and capable of exhibiting a signal of predetermined frequency when its corresponding original signal is in one state and capable of exhibiting no signal when its corresponding original signal is in the other state;

transmission means to transmit said single multiplexed signal from the transmit section of each apparatus to the receive section of the other apparatus;

means in each receive section for receiving said single multiplexed signal from said transmission means and for providing a plurality of electrical digital output signals corresponding to said signals exhibited by said other channels of said single multiplexed signal for operating the plurality of devices connected to that element in which the receive section is included;

and means in each transmit section for periodically sensing the status of said plurality of separate original electrical digital signals and for providing reset signals to said first means in that transmit section to cause the latter to provide a sequence of updated single multiplexed signals.

23. A system according to claim 22 wherein said single multiplexed signal is an optical signal and wherein said transmission means includes fiber optic means for transmitting said optical signal from a first means in one element to a second means in another element.

24. A control system comprising:
a plurality of signal sending units, each unit adapted to provide an original electrical control signal;
a plurality of receiving devices, each device being operable in response to one of said control signals to assume one of a plurality of operating conditions;
a plurality of feedback signal generators, each generator being operable in response to an operating condition of one of said devices to provide an electrical feedback signal indicative of an operating condition;
status monitoring means for providing signal information as to the operating condition of said devices;
first means for transmitting control signal information from said sending units to said receiving devices to effect operation of said receiving devices;
and second means for transmitting feedback signal information from said signal generators to said status monitoring means;
each of said first and second means comprising:
encoding means for encoding a plurality of separate electrical signals originating therefrom into a single multiplexed optical signal comprising a plurality of discrete channels, each channel representing one of said separate electrical signals;
and decoding means for receiving and decoding said single multiplexed optical signal into a plurality of separate electrical signals,
the separate electrical signals based on control signal information provided by said decoding means of said first means effecting operation of said receiving devices,
the separate electrical signals based on feedback signal information provided by said decoding means of said second means effecting operation of said status monitoring means.

25. A system for fiber optic communications for communicating a plurality of signals between a control element and a data management element, said data management element being connected to a plurality of devices to be controlled, said system comprising:
A. a pair of communications apparatuses, one located at and connected for communication with said control element, and the other located at and connected for communication with said data management element, each communications apparatus including a transmit section and a receive section, the transmit section of each communications apparatus connected via a fiber optic link to the receive section of the other communications apparatus;
B. each transmit section comprising:

1. encoding means for conditioning and encoding separate original digital electrical signals, each having an "on" state or an "off" state, into a first single multiplexed electrical signal comprising discrete channels, each of said channels being devoted to a predetermined one of said separate original digital electrical signals;
2. optical transmission means for converting said first single multiplexed electrical signal to an optical signal and for transmitting said optical signal via a fiber optic link; and
3. means in said optical transmission means for converting said "on" states of said separate original digital electrical signals, as occurring in said first single multiplexed electrical signal from said encoding means, to a period of a predetermined frequency, and for converting said "off" states of said original digital electrical signals, as occurring in said first single multiplexed electrical signal from said encoding means, to a period of no signal;

C. each receive section comprising:
1. optical reception means for receiving and converting said transmitted optical signal to a second single multiplexed electrical signal comprising discrete channels, each of the last-recited channels being devoted to a predetermined one of said separate original digital electrical signals;
2. decoding means for decoding said second single multiplexed electrical signal into a plurality of received digital electrical signals, each of said received digital electrical signals having an "on" state or an "off" state corresponding to one of said separate original digital electrical signals;
3. means in said optical reception means for converting said periods of frequency and said periods of no signal to said second single multiplexed electrical signal as needed by said decoding means for decoding into said received electrical signals to effectively communicate said separate original electrical signals;
4. and a plurality of output drive circuits for communicating said received digital electrical signals to the respective element to which the respective apparatus is connected.

26. A system for fiber optic communications as recited in claim 25 wherein said encoding circuits include synchronization means for generating a synchronization channel and combining it with said discrete channels based on said separate original digital electrical signals into said first single multiplexed electrical signal, said synchronization channel being arranged first in order of channels transmitted within said first single multiplexed electrical signal.

27. A system for fiber optic communications as recited in claim 26 further comprising clock means connected to each said encoding means and to each said decoding means within each said communications apparatus, for employing said synchronization channel to synchronize each said decoding means connected thereto by said optical transmission means.

* * * * *